(12) United States Patent
Chou et al.

(10) Patent No.: US 8,736,718 B2
(45) Date of Patent: May 27, 2014

(54) NOISE ELIMINATION METHOD OF IMAGE SEQUENCE

(75) Inventors: Hong-Long Chou, Taipei (TW); Chen-Hung Chan, Taoyuan County (TW)

(73) Assignee: Altek Corporation, Hsinchu (TW)

( * ) Notice: Subject to any disclaimer, the term of this patent is extended or adjusted under 35 U.S.C. 154(b) by 715 days.

(21) Appl. No.: 12/649,936

(22) Filed: Dec. 30, 2009

(65) Prior Publication Data

US 2010/0165154 A1    Jul. 1, 2010

(30) Foreign Application Priority Data

Dec. 31, 2008   (TW) .............................. 97151811 A (51) Int. Cl.
*H04N 5/217* (2011.01)
*H04N 5/00* (2011.01)

(52) U.S. Cl.
USPC .......................................... 348/241; 348/607

(58) Field of Classification Search
CPC ................. H04N 5/217; H04N 5/00
USPC ...... 348/220.1, 241, 607, 908, 909; 382/236, 254, 260, 261, 275, 278, 300; 345/208; 358/463

See application file for complete search history.

(56) References Cited

U.S. PATENT DOCUMENTS

2003/0227552 A1*  12/2003  Watanabe ................. 348/220.1
2009/0231314 A1*  9/2009  Hanaoka et al. ............. 345/208

* cited by examiner

*Primary Examiner* — Twyler Haskins
*Assistant Examiner* — Akshay Trehan
(74) *Attorney, Agent, or Firm* — Morris Manning & Martin LLP; Tim Tingkang Xia, Esq.

(57) ABSTRACT

A noise elimination method of an image sequence is described. During a color separation of a raw image data captured by an image capturing element, 3D filtering is integrated. First, the raw image data is converted into a gray-scaled full luma image, an interframe filtering process is performed to eliminate possible noises in the gray-scaled full luma image, and an interpolation process is performed with the raw image data. During the implementation, an adaptive frame average filtering process is also performed to obtain a preferred image filtering result through an appropriate filtering manner. Therefore, an adaptive interframe interpolation for eliminating noises is to prevent noises or artifacts generated by the noises from affecting the subsequent image processing.

10 Claims, 6 Drawing Sheets

NOISE ELIMINATION METHOD OF IMAGE SEQUENCE

CROSS-REFERENCE TO RELATED APPLICATIONS

This non-provisional application claims priority under 35 U.S.C. §119(a) on Patent Application No(s). 097151811 filed in Taiwan, R.O.C. on Dec. 31, 2008, the entire contents of which are hereby incorporated by reference.

BACKGROUND OF THE INVENTION

1. Field of Invention

The present invention relates to a noise elimination method of video signals, and more particularly to a noise elimination method of an image sequence which is integrated with 3D noise filtering during color separation by using color filter array interpolation (CFAi).

2. Related Art

Generally, noises occurring in an image include impulse noises, salt and pepper noises, and Gaussian noises, among which the Gaussian noises mostly conform to the noises generated by an image sensor. Mean filters, median filters, and Gaussian filters are common in 3D noise filters. The mean filter and the median filter are both linear filters, which mainly employ a filtering method of directly adding pixel values of adjacent images or adding the pixel values after being multiplied by a weighted value and then obtaining a mean value thereof to replace an intermediate pixel value. The Gaussian filter applies the normal distribution characteristic of Gaussian function, and selects an appropriate smoothing parameter ($\sigma$) to control the extent of eliminating the noises. In addition, methods of eliminating noises by using Fourier transform and wavelet transform are also available.

The noises randomly occur in an image sequence, existing 3D noise filtering technologies are all applied to spatial space such as full RGB or YCC color space, and most 3D filtering processes applied to video signals (or image sequences) are performed after color separation through color filter array interpolation (CFAi). However, the noises may affect results of the color separation through CFAi and the subsequent processes, and meanwhile the processing results of the above processes may also affect the correctness of motion estimation. Moreover, artifacts generated by the noises in the color separation through CFAi may also affect the correctness of motion estimation.

SUMMARY OF THE INVENTION

Accordingly, the present invention is a noise elimination method of an image sequence, which integrates color separation through color filter array interpolation (CFAi) with 3D noise filtering, so as to solve the above problems in the prior art.

A preferred embodiment of the method provided in the present invention comprises the following steps.

In Step A, a raw image data captured by an image capturing element is acquired.

In Step B, an interframe luma processing step is performed, in which the raw image data of a current frame is defined as a base image, the raw image data of a previous frame is defined as a reference image, and the base image and the reference image are respectively converted into a full luma base image and a full luma reference image represented by gray-scaled luminance values.

In Step C, a full RGB generation step is preformed, in which a difference operation is performed on the base image and the reference image by using the full luma base image and the full luma reference image generated in the above step, so as to generate a noise-free full RGB image.

The present invention also provides an adaptive noise elimination method of an image sequence, which comprises an adaptive average filtering step. In the filtering step, by using information about inter-image and intra-image such as smoothness and similarity, an appropriate filtering manner is selected when processing the base image and the reference image, thereby obtaining a desired image filtering result.

The present invention further provides a noise elimination method of video signals through motion compensation, in which a global motion estimation and an image registration are performed to compensate the base image and the reference image during processing, so as to obtain a desired image filtering result.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
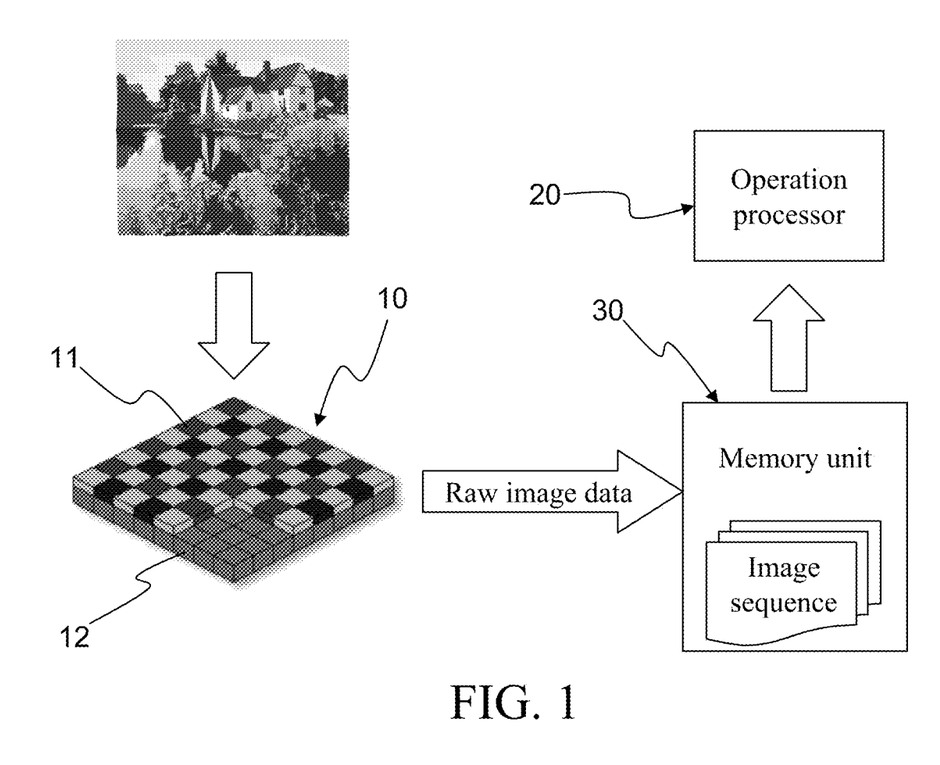
FIG. 1 shows a preferred embodiment of a hardware system for implementing a method according to the present invention.

Referring to FIG. 1, a preferred embodiment of a hardware system applying a method according to an embodiment of the present invention is shown. The system comprises an image capturing element 10, an operation processor 20, and a memory unit 30.

The image capturing element 10 is an image sensor 12 having a color filter array (CFA) 11, and is used to capture an image of an external object and convert the image into an electrical signal having a raw image data, in which the electrical signal is a digital image signal. Then, a consecutive image sequence is generated by continuous shooting, which is the so-called video signal.

The operation processor 20 executes the steps of the method according to the present invention through programs, so as to eliminate noises in the above raw image data.

The memory unit 30 is used to store relevant data and operation procedures during the image processing.

Particularly, the hardware system in FIG. 1 may be a part of a digital camera, a digital video camera, or other similar electronic devices.

Figure 2:
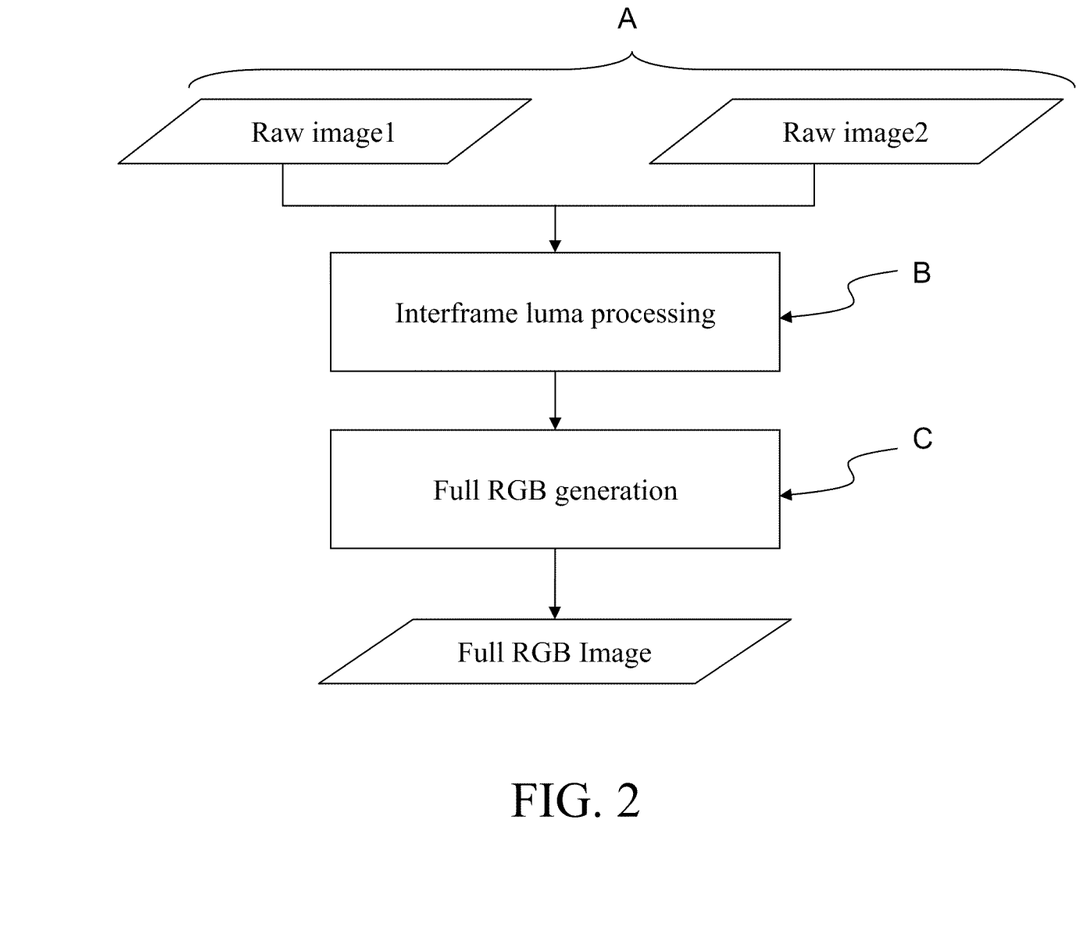
FIG. 2 is a flow chart illustrating main steps of a method according to the present invention.

Referring to FIG. 2, a main flow chart illustrating a noise elimination method of an image sequence according to the present invention is shown. The method comprises the following steps.

In Step A, a raw image data captured by an image capturing element is acquired, so as to obtain a raw image data of a current frame (current image2) and a raw image data of a previous frame (previous image1), the raw image data of the current frame (current image2) is defined as a base image (raw image2), and the raw image data of the previous frame (previous image1) is defined as a reference image (raw image1).

In Step B, an interframe luma processing step is performed, so as to convert the base image (raw image2) and the reference image (raw image1) into a full luma base image (full luma image2) and a full luma reference image (full luma image1) represented by gray-scaled luminance values through a luma channel generation process.

In Step C, a full RGB generation step is performed, in which a difference operation is performed on the base image and the reference image by using the full luma base image (full luma image2) and the full luma reference image (full luma image1) generated in the above step, so as to generate a noise-free full RGB image.

Figure 3:
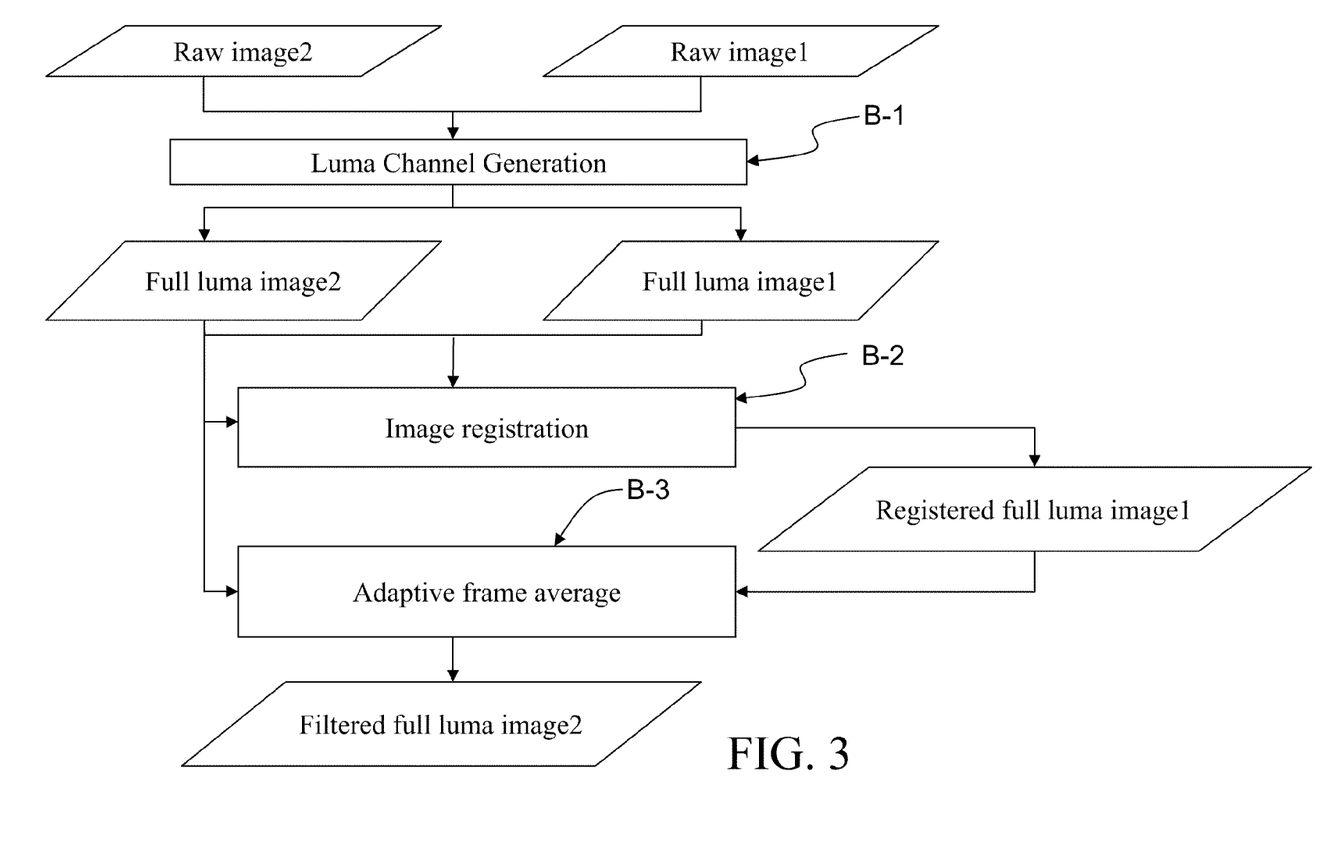
FIG. 3 is a flow chart illustrating partial steps of the method according to the present invention.

Referring to FIG. 3, detailed steps of the interframe luma processing in Step B are shown as follows.

In Step B-1, the base image (raw image2) and the reference image (raw image1) are converted into luminance signals through a luma channel generation process, for example, by using a mask, so as to obtain gray-scaled full luma images, and respectively obtain a full luma base image (full luma image2) and a full luma reference image (full luma image1).

In Step B-2, an image registration is performed on the full luma base image (full luma image2) and the full luma reference image (full luma image1), so as to generate a registered full luma reference image (registered full luma image1).

In Step B-3, an adaptive frame average filtering process is performed on the registered full luma reference image (registered full luma image1) and the full luma base image (full luma image2) generated in the above step, so as to generate a filtered full luma base image with noises eliminated (filtered full luma image2).

Figure 4:
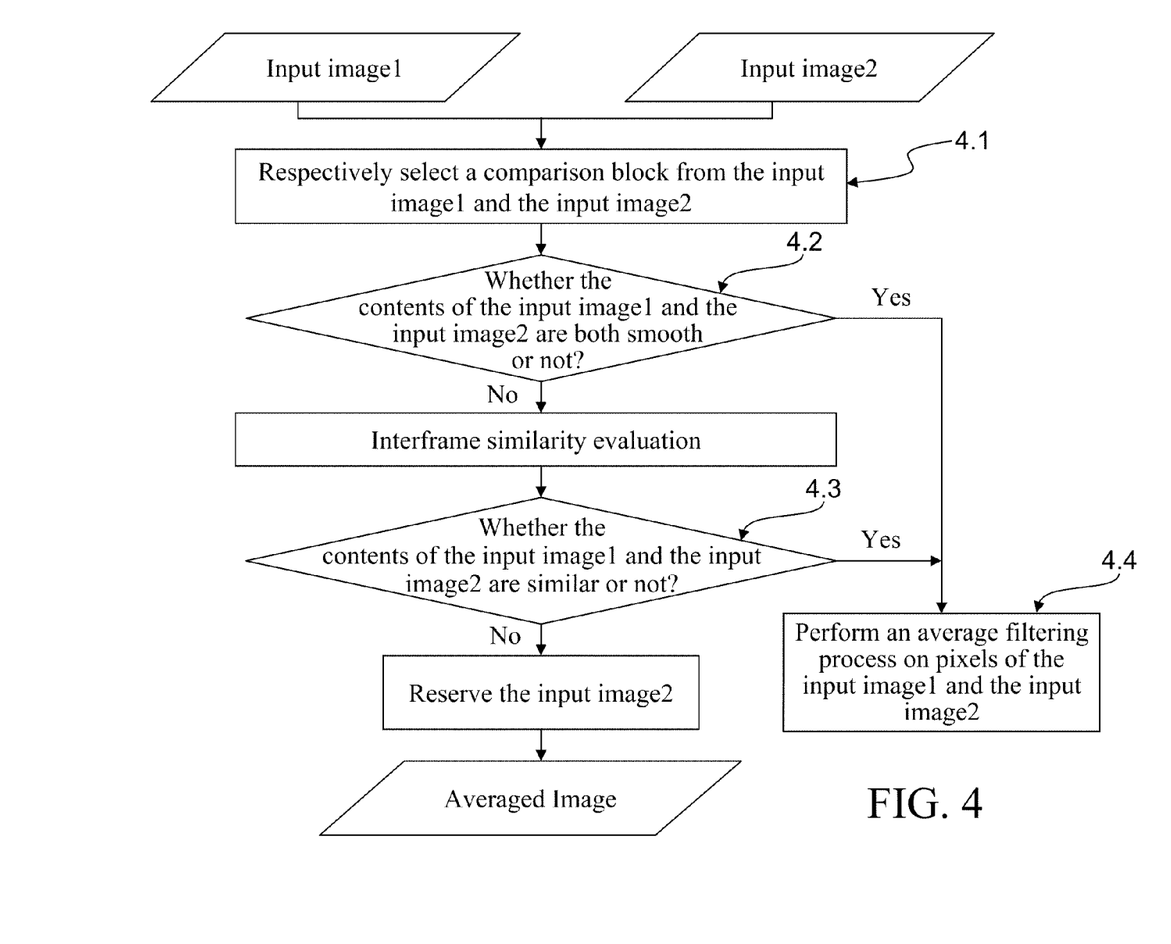
FIG. 4 is a flow chart illustrating partial steps of the method according to the present invention.

A preferred embodiment of the adaptive frame average filtering process according to the present invention is shown in FIG. 4. The process comprises the following steps.

In Step 4.1, a comparison block is respectively selected from an input image1 and an input image2. For example, the registered full luma reference image (registered full luma image1) and the full luma base image (full luma image2) in Step B-3 are the input image1 and the input image2 in this step.

In Step 4.2, the two selected comparison blocks are compared on smoothness, for example, a comparison analysis on image grad is performed, so as to determine whether the input image1 and the input image2 both have smooth image contents. In other words, if the input image1 and the input image2 both have smooth image contents, Step 4.4 is performed, and if the input image1 and the input image2 have high contrast or detailed image contents, Step 4.3 is performed.

In Step 4.3, an interframe similarity evaluation is performed on the two selected comparison blocks, particularly, by means of operating a sum of absolute difference (SAD), so as to determine whether the input image1 and the input image2 have a high similarity. If the input image1 and the input image2 have a high similarity, Step 4.4 is performed; otherwise, the content of the input image2 is reserved to directly serve as an averaged output image.

In Step 4.4, an average filtering process is performed on pixels of the input image1 and the input image2, so as to generate an averaged output image.

Figure 5:
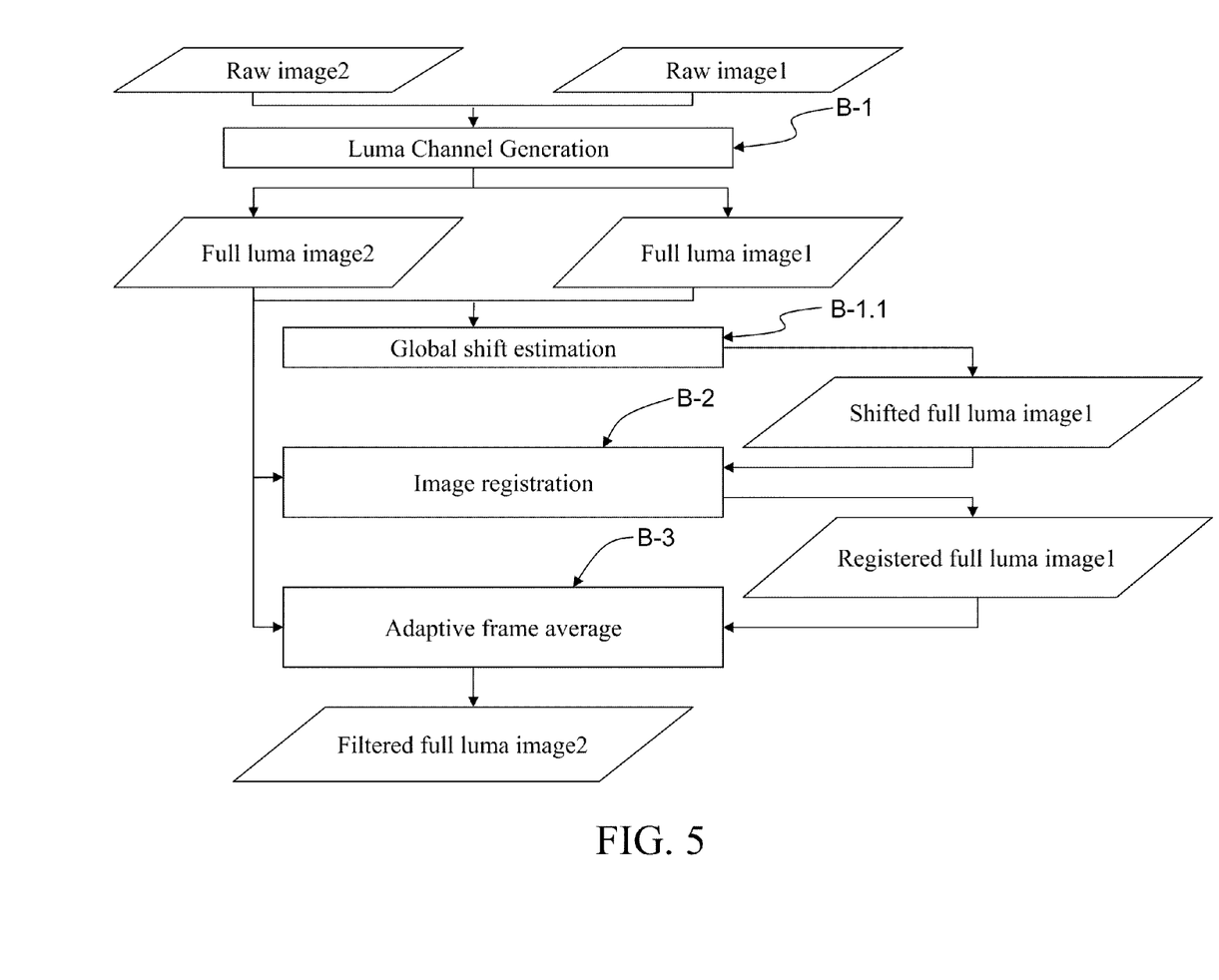
FIG. 5 is a flow chart illustrating partial steps of the method according to another preferred embodiment of the present invention.

Another preferred embodiment of the interframe luma processing in Step B further comprises a step of motion compensation. As shown in FIG. 5, the global motion estimation in Step B-1.1 is performed on the full luma base image (full luma image2) and the full luma reference image (full luma image1), so as to obtain corresponding relations between pixels of the full luma base image (full luma image2) and the full luma reference image (full luma image1), and generate a registered full luma reference image (shifted full luma image1). After that, the image registration in Step B-2 is performed on the registered full luma reference image (shifted full luma image1) and the above-mentioned full luma base image (full luma image2).

In the present invention, the global shift estimation is adopted to reduce the pixel-wise searching range of a motion estimation module, and the full luma reference image (full luma image1) is slightly shifted before the image registration, thus reducing the processing time of the image registration.

Figure 6:
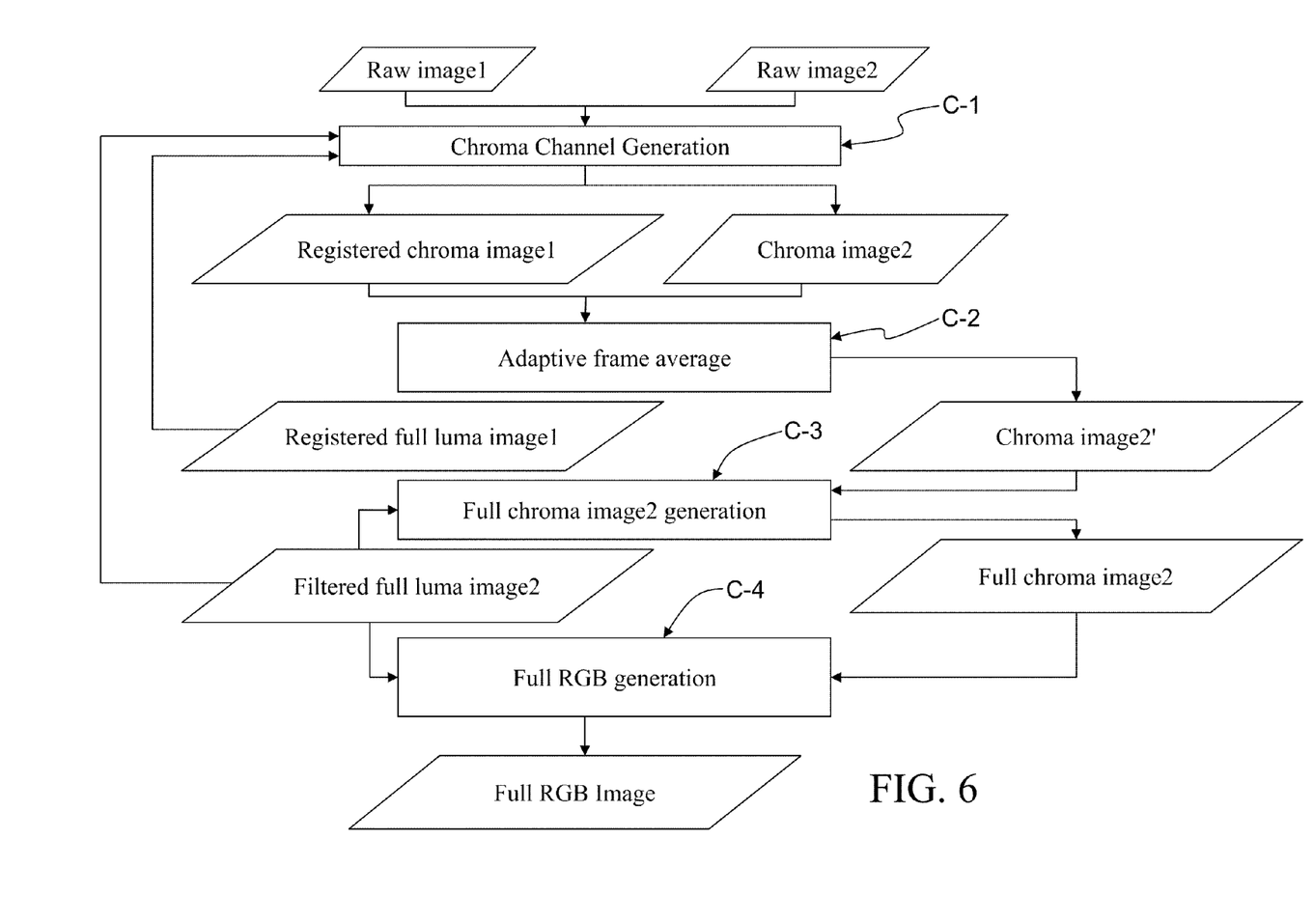
FIG. 6 is a flow chart illustrating partial steps of the method according to the present invention.

Referring to FIG. 6, a preferred embodiment of Step C about full RGB generation in FIG. 2 is shown. Step C further comprises the following steps.

In Step C-1, a chroma image is obtained. Components of three chroma, i.e., red (r), green (g), and blue (b) are obtained respectively from the base image (raw image2) (the raw image data of the current frame (current image2)) and the reference image (raw image1) (i.e., the raw image data of the previous frame (previous image1)) by using the chroma channel technology. In other words, an difference operation is performed on the registered full luma reference image (registered full luma image1) obtained in Step B-2 and the filtered full luma base image (filtered full luma image2) generated in Step B-3 with the reference image (raw image1) and the base image (raw image2), so as to obtain the chroma component information (r, g, b) of the registered chroma reference image (registered chroma image1) and the chroma base image (chroma image2). The difference operation equations comprise Equation 1.1 and Equation 1.2 as follows.

$$\text{chroma image1} = \text{CFA image1}(r,g,b) - \text{registered full luma image1}(Y) \quad \text{(Equation 1.1)}$$

$$\text{chroma image2} = \text{CFA image2}(r,g,b) - \text{registered full luma image1}(Y) \quad \text{(Equation 1.2)}$$

CFA (r, g, b) represents the raw image data of the r, g, b signals captured by the image sensor having the CFA.

In Step C-2, an adaptive frame average filtering process is performed. The registered chroma reference image (registered chroma image1) and the chroma base image (chroma image2) generated in Step C-1 respectively serve as the current and the previous frame images. Then, the chroma component data (r, g, b) of an average chroma base image (chroma image2') is obtained through the adaptive frame average filtering process as shown in FIG. 4.

In Step C-3, a full chroma image of the base image is generated, in which the filtered full luma base image (filtered full luma image2) generated in Step B-3 and the average chroma base image (chroma image2') generated in Step C-2 are integrated into a full chroma image of the base image (full chroma image2).

In Step C-4, a full RGB generation step is performed, in which the filtered full luma base image (filtered full luma image2) generated in Step B-3 and the full chroma base image (chroma image2) generated in Step C-3 are integrated into a full RGB image, and the employed operation equation is Equation 2 as follows.

$$\text{Full RGB Image} = \text{Filtered Full Luma Image2}(Y) + \text{full chroma image2}(r,g,b) \quad \text{(Equation 2)}$$

What is claimed is:

1. A noise elimination method of an image sequence, for eliminating electronic noises on an image sequence captured by an image sensor having a color filter array (CFA), comprising:

Step A: acquiring a raw image data captured by the image sensor, so as to obtain a raw image data of a current frame as an input frame and a raw image data of a previous frame, defining the raw image data of the current frame as a base image, and defining the raw image data of the previous frame as a reference image;

Step B: performing an interframe luma processing step, so as to respectively convert the base image and the reference image into a full luma base image and a full luma reference image represented by gray-scaled luminance values, comprising:

Step B-1: converting the base image and the reference image into luminance signals through a luma channel generation process, so as to obtain a full luma base image and a full luma reference image respectively;

Step B-2: performing an image registration step, wherein a registration process is performed on the full luma base image and the full luma reference image, so as to generate a registered full luma reference image; and Step B-3: performing an adaptive frame average filtering step, wherein an adaptive frame average filtering process is performed on the registered full luma reference image and the full luma base image, so as to generate a filtered full luma base image with noises eliminated; and Step C: performing a full RGB generation step, wherein a difference operation is performed on the base image and the reference image by using the full luma base image and the full luma reference image generated in Step B, so as to generate a noise-free full RGB image as an output frame to replace the raw image data of the current frame, wherein a frame rate of the input frame and a frame rate of the output frame is the same, and Step C comprises:

Step C-1: obtaining a chroma image, and performing the difference operation on the reference image and the base image respectively by using the registered full luma reference image obtained in Step B-2 and the filtered full luma base image obtained in Step B-3, so as to obtain chroma component information about a registered chroma reference image and a chroma base image respectively, wherein the difference operation is performed using the equations of:

chroma image1=CFA image1($r,g,b$)−registered full luma image1; and chroma image2=CFA image2($r,g,b$)−registered full luma image1, wherein CFA represents color filter array, chroma image1 and chroma image2 represent chroma images of the reference image and the current image respectively, and CFA image1 (r, g, b) and CFA image2 (r, g, b) represent the raw image data of the r, g, b signals of the reference image and the current image captured by the image sensor having the CFA respectively;

Step C-2: performing an adaptive frame average filtering step, wherein the registered chroma reference image and the chroma base image generated in Step C-1 serve as a previous image and a current image respectively, and an adaptive frame average filtering process is performed to obtain an averaged chroma base image;

Step C-3: performing a step of generating a full chroma image of the base image, wherein the filtered full luma base image generated in Step B-3 and the averaged chroma base image generated in Step C-2 are integrated into a full chroma image of the base image; and Step C-4: performing a full RGB generation step, wherein the filtered full luma base image obtained in Step B-3 and the chroma image of the base image generated in Step C-3 are integrated into a full RGB image.

2. The noise elimination method of an image sequence according to claim 1, wherein Step B-3 comprises:

Step d1: respectively selecting a comparison block from the registered full luma reference image and the full luma base image;

Step d2: comparing the two selected comparison blocks on smoothness, and determining whether the registered full luma reference image and the full luma base image both have smooth image contents; and Step d3: performing an interframe similarity comparison on the two selected comparison blocks, and determining whether the registered full luma reference image and the full luma base image have a high similarity.

3. The noise elimination method of an image sequence according to claim 2, wherein when the registered full luma reference image and the full luma base image both have smooth image contents, an average filtering process on pixels of the registered full luma reference image and the full luma base image is performed, so as to generate an averaged output image.

4. The noise elimination method of an image sequence according to claim 2, wherein when the registered full luma reference image and the full luma base image have high contrast or detailed image contents, and the registered full luma reference image and the full luma base image have a high similarity, an average filtering process on pixels of the registered full luma reference image and the full luma base image is performed, so as to generate an averaged output image.

5. The noise elimination method of an image sequence according to claim 2, wherein when the registered full luma reference image and the full luma base image have high contrast or detailed image contents, and the registered full luma reference image and the full luma base image don't have a high similarity, the content of the full luma base image is reserved to directly serve as an averaged output image.

6. The noise elimination method of an image sequence according to claim 1, wherein Step B further comprises:

performing a global motion estimation on the full luma base image and the full luma reference image, so as to obtain corresponding relations between pixels of the full luma base image and the full luma reference image, and generate a registered full luma reference image; and performing an image registration on the registered full luma reference image and the full luma base image through Step B-2.

7. The noise elimination method of an image sequence according to claim 1, wherein Step B-3 comprises:

Step d1: respectively selecting a comparison block from the chroma reference image and the chroma base image;

Step d2: comparing the two selected comparison blocks on smoothness, and determining whether the chroma reference image and the chroma base image both have smooth image contents, and Step d3: performing an interframe similarity comparison on the two selected comparison blocks, and determining whether the chroma reference image and the chroma base image have a high similarity.

8. The noise elimination method of an image sequence according to claim 7, wherein when the chroma reference image and the chroma base image both have smooth image contents, an average filtering process on pixels of the chroma reference image and the chroma base image is performed, so as to generate an averaged output image.

9. The noise elimination method of an image sequence according to claim 7, wherein when the chroma reference image and the chroma base image have high contrast or detailed image contents, and the chroma reference image and the chroma base image have a high similarity, an average filtering process on pixels of the chroma reference image and the chroma base image is performed, so as to generate an averaged output image.

10. The noise elimination method of an image sequence according to claim 7, wherein when the chroma reference image and the chroma base image have high contrast or detailed image contents, and the chroma reference image and the chroma base image don't have a high similarity, the content of the chroma base image is reserved to directly serve as an averaged output image.

* * * * *